(No Model.) 2 Sheets—Sheet 1.
J. DAVIE.
HORSE CHECKING DEVICE.
No. 524,988. Patented Aug. 21, 1894.
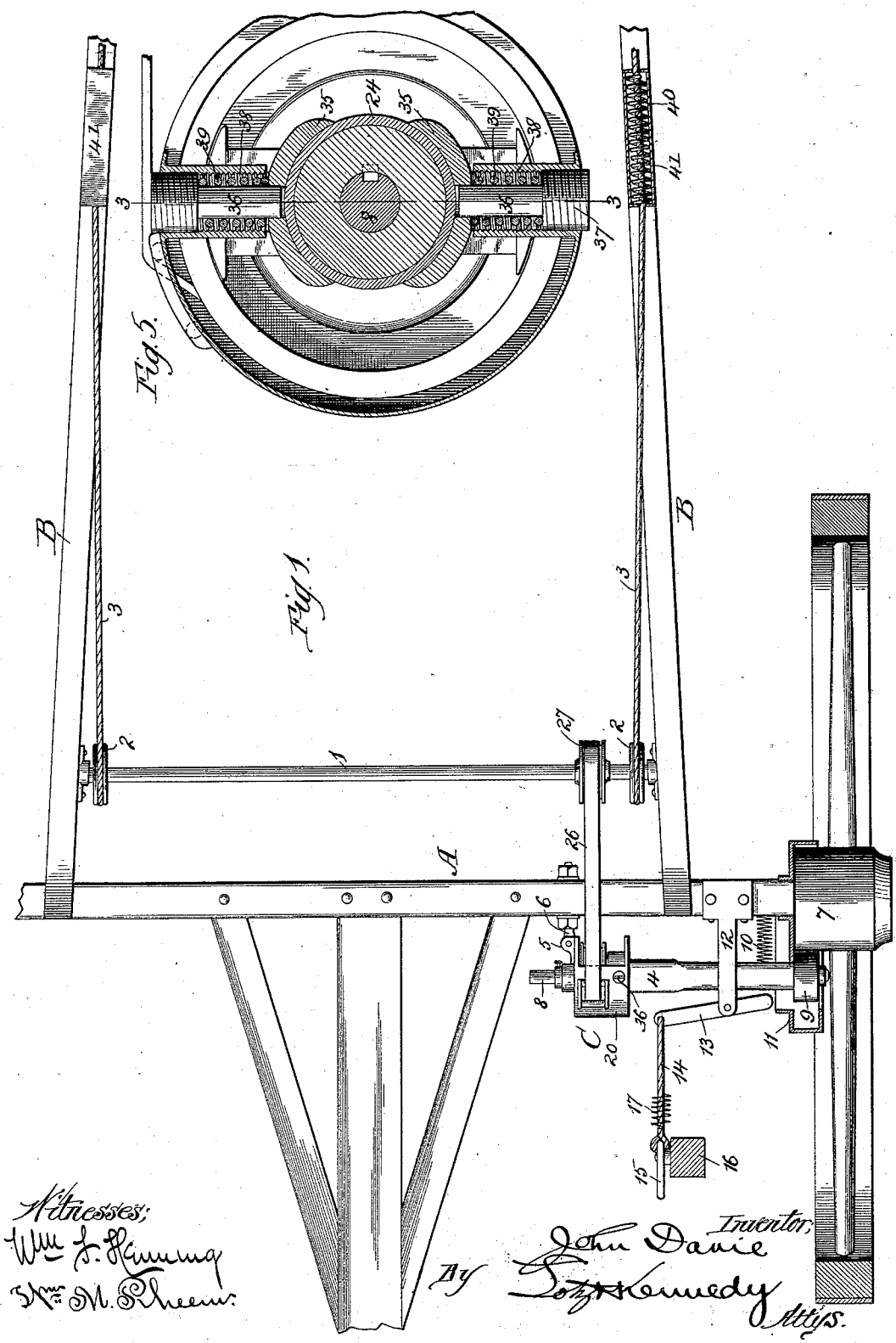

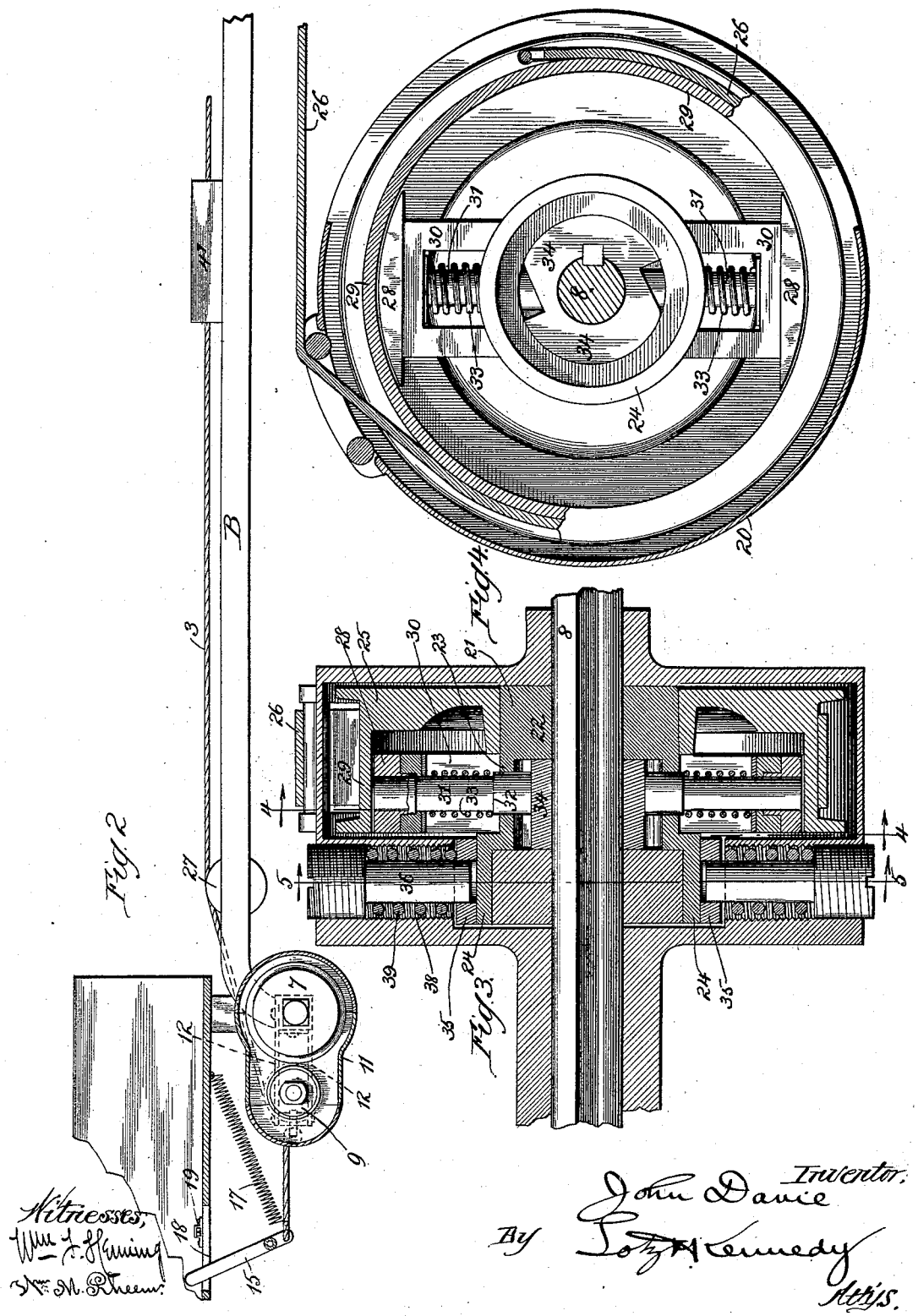

UNITED STATES PATENT OFFICE.

JOHN DAVIE, OF CHICAGO, ILLINOIS.

HORSE-CHECKING DEVICE.

SPECIFICATION forming part of Letters Patent No. 524,988, dated August 21, 1894.

Application filed November 7, 1892. Serial No. 451,243. (No model.)

*To all whom it may concern:*

Be it known that I, JOHN DAVIE, a citizen of the United States, residing at Chicago, in the county of Cook and State of Illinois, have invented certain new and useful Improvements in Horse-Checks; and I do hereby declare the following to be a full, clear, and exact description of the invention, such as will enable others skilled in the art to which it appertains to make and use the same.

This invention relates to a novel construction in a device that is adapted to be attached to a vehicle and to the bit of the harness of a horse that is hitched to such vehicle, and which is further adapted to exert a pull upon the bit of the horse to prevent it running away or moving when it is not desired that it should, and further, to prevent the horse from being stolen when left standing.

The objects of the invention are to provide a device of this character that can be easily attached to any vehicle, that will be simple and durable in construction and so constructed that when the horse has been checked by its operation the tension upon the bit will be relieved.

The invention consists in the features of construction and combinations of parts hereinafter fully described and specifically claimed.

In the accompanying drawings illustrating my invention,—Figure 1 is a fragmentary plan view, partly in section, of the front axle, shaft and one wheel of a vehicle provided with my invention. Fig. 2 is a side elevation with the wheel removed. Fig. 3 is a vertical central section of the checking device taken on the line 3—3 of Fig. 5. Fig. 4 is a vertical transverse section taken partly on the line 4—4 of Fig. 3. Fig. 5 is a similar view taken on the line 5—5 of Fig. 3.

Referring now to said drawings, A indicates the front axle of a vehicle and B the thills attached thereto in the usual manner. Mounted between the thills is a revoluble shaft 1 that is provided near each end with a winding pulley 2 to which are attached the rear ends of two lines or strands 3 which run forward and are secured at their forward ends to the bit of the harness. It will be noted that whereas I have illustrated two lines 3, yet only one can be used in accordance with the principle involved by my invention.

Mounted upon the axle A is the checking device C which is geared to one of the wheels of the vehicle and to the shaft 1, as will be fully described hereinafter, in such a manner that when the vehicle moves forward the wheel will, through the intermediacy of said checking device, turn the shaft 1 to wind the lines 3 upon the pulleys 2 and thereby exert a backward pull upon the bit which will, of course, serve to check the horse in an obvious manner. In accordance with the principle involved by my invention said checking device is so constructed that at the first part of the forward movement of the horse the backward pull upon the lines 3 will commence, but that as soon as the horse stops the tension upon the lines will be relieved so that the horse will not back farther but, being brought to a standstill, will remain. This feature of my invention is intended to overcome the objectionable features of horse-check now in use, which, as far as I am informed, exert a backward pull upon the horse as it moves forward, but which backward pull is not relieved until the horse backs to its original position. This is a manifest objection, for it will be noted that if a horse starts off suddenly the checking will be proportionate, so that the horse is jerked backward suddenly, which not only is injurious but is liable to injure the horse and further, to make the horse restless, and it is the object of my invention to overcome these and other objections now existing.

The checking device C is supported by a frame 4 which is pivoted by means of a lug 5 to an eye 6 upon the axle A and has its other end located adjacent to the hub 7 of the wheel of the vehicle. A shaft 8 is mounted within the frame 4 and carries the operative parts of the checking device, while its end adjacent to the hub 7 is provided with a friction wheel 9, which, when thrown against said hub 7, serves to communicate the rotary motion thereof to said shaft 8. As before described, said frame 4 is pivotally connected with the axle at its other end, so that the friction wheel or pulley 9 can be moved toward and away from the hub 7, and a spring 10 bearing at its opposite ends against said axle A and frame 4 and acting by expansion serves to hold the friction pulley 9 normally out of gear or separated from the hub 7. A housing or mud guard 11 is secured to the axle A and surrounds the hub and the friction pulley 9, as shown, and protects the same from mud, dirt, &c. The devices for moving said frame 4 upon its pivot to throw the friction pulley 9 against the hub, are constructed as follows: Upon the axle A are two rearwardly extending arms 12, shown in dotted lines in Fig. 2, located above and below the frame 4 and serving thereby as a guide. To the rear ends of these arms 12 and in the rear of the frame 4 is pivoted a lever 13, one end of which is located to engage said frame 4, while the other end is connected by a rope or strand 14 with the lower end of a pivoted lever 15 mounted upon a projection 16 upon the body of the vehicle. A spring 17 connected with said lever or with the rope 14 adjacent thereto, and with the body of the vehicle, serves to hold the lower end of the lever at the forward limit of its movement to permit the disengagement of the friction pulley 9 and hub 7. The upper end of the lever 15 projects into the body of the vehicle through a slot 18, and it will be noted that when said lever 15 is thrown forward it will serve through the intermediacy of rope 14 and lever 13 to force the friction pulley 9 against the hub 7. A catch 19, of any convenient construction, is located to engage said lever 15 at the forward limit of its movement. And it will, of course, be manifest that such catch can be a simple one, to be released by any one, or it can be in the form of a lock which can be released only by the person having a key or knowing the combination should it be a combination lock.

Near the end of the frame 4 that is pivoted to the axle A is provided a cylindrical housing 20 within which are located the operative parts of the device which serve to communicate the motion of the shaft 8 to the shaft 1.

Referring now to Figs. 3, 4 and 5, 21 indicates a collar that is mounted within the housing upon the shaft 8 and is provided with a hub portion 22 provided at one side with the annular flange 23 at the outer edge of said hub, while said flange 23 is provided with an enlarged annular flange 24. The combined length of the collar 21 is about equal to the width of the housing as shown in Fig. 3. A winding drum 25 is mounted upon the hub portion 22 of the collar and is adapted to rotate thereon, while the outer face or winding portion of said drum 25 is located to one side of its hub and the hub 22 of the collar and overhangs the flange 23 of said collar. A strap or strand 26 is connected at its opposite ends with the said drum 25 and with a winding pulley 27 upon the axle 1 of the thills. The devices for causing said winding drum to turn with the shaft comprise the friction clutches or shoes 28 that are located within the overhanging portion 29 of the winding drum and are adapted to bear against the inner face of the same. The said friction shoes 28 are located diametrically opposite each other, and being similar in construction a description of one will suffice. Upon the flange 23 of the collar is a frame 30 and the rear flat face of the friction shoes 28 abuts against the end of said frame. The said friction shoe 28 is secured to a pin 31 that passes through an opening in the end of said frame 30 and through an opening in the flange 23 and is provided with a beveled inner end. Located between the inner face of the frame 30 and a shoulder 32 on said pin 31 is a spring 33 that serves to hold the friction shoe away from the inner face of the overhanging portion 29 in an obvious manner. Rigidly mounted upon the shaft 8 and within the flange 23 is a cam or eccentric 34, the faces of which engage the beveled inner ends of the pins 31, said parts being so constructed and arranged with relation to each other that when the cam or eccentric 34 revolves with relation to the pins 31 said pins will be thrown outward and thereby cause the shoes 28 to engage the inner face or clutch face of the winding drum 25 with sufficient pressure to cause said winding drum to rotate with the shaft. To hold the collar 21 sufficiently to cause the pins to offer enough resistance to the cam or eccentric to be thrown outwardly, I arrange two clutch shoes 35 that are adapted to bear against the flange 24. Said clutch shoes engage the said flange 24 and are held by a pin 36 upon the end of a screw bolt 37, which bolt engages a screw-threaded aperture 38 of the housing 20, and a spring 39 is located within said screw-threaded aperture 38 and bears at its opposite ends against the inner end of the bolt 37 and the friction shoe 35.

The friction shoes and accompanying parts are duplicated of course and are located diametrically opposite each other. It will of course be noted that by tightening up the bolts 37 the tension with which the friction shoes will engage the flange 24 can be regulated.

The parts of my invention being constructed and arranged as described, the operation is as follows: When driving along, of course, the lever 15 is thrown to the rear, which throws the device out of gear as described. When a stop is made and the driver desires to leave the horse and vehicle alone, the lever 15 is thrown forward to throw the friction pulley 9 into gear with the hub 7. I will now suppose that the horse moves forward and in this case the rotary movement communicated to the shaft by said friction pulley 9 will serve to turn the cam or eccentric 34, and the collar 21 being held to a certain extent by the clutch shoes 35 will at first hold the pins 31 immovable, whereupon the cam or eccentric will throw the pins and the clutch shoes 28 carried thereby out against the clutch faces 29 of the winding drum, which movement will cause the winding drum 25 to rotate with the shaft by reason of the clutch connection between such parts, while the power of the shaft will also cause the collar 21 to turn independently of the clutch shoes 35. In this way it will be seen that the strap 26 is wound upon the winding drum 25 and thereby turns the shaft 1 which winds up the lines 3 upon the pulley to check the horse. The backward pull upon the lines in checking the horse will of course bring him to a standstill and, as in the case of all horses when brought to a standstill, he will move backward a slight distance, which will have the effect of turning the cam or eccentric in the opposite direction and releasing the pins 31, whereupon the springs 33 will retract the shoes 28 from engagement with the winding drum. The winding drum is then free to rotate and will unwind quickly and relieve the tension upon the bit of the horse, thereby obviating the objectionable back-pull as before referred to. The lines 3 will be pulled forward to their normal position by a spring 40 secured at one end to said line and bearing at its opposite end against the end of a box 41 through which the line passes. It will of course be noted that should the horse attempt to move again the same action will occur.

It will of course be understood that I contemplate making various mechanical changes that may be desirable, for instance, any suitable gearing between the shaft 8 and hub 7 can be substituted for that shown.

I claim as my invention—

1. A horse-check having a checking device pivotally mounted upon the vehicle, gearing between said checking device and a rotating part of the vehicle to cause the shaft of said checking device to rotate, a winding drum mounted upon the shaft of said checking device and connected with the lines 3 that are connected with the bridle bit, and a clutch between said winding drum and shaft comprising clutch shoes 28 to engage the winding drum, said clutch shoes being carried by collar 21 loosely mounted upon the shaft and adapted to be held immovable with relation to the shaft by friction shoes upon a stationary part of the checking device, and a cam 34 rigid upon the shaft and engaging pins upon said clutch shoes 28, substantially as described.

2. A horse-check comprising a checking device pivotally mounted upon the vehicle, gearing between said checking device and a rotating part of the vehicle to cause the shaft of said checking device to rotate, a winding drum loosely mounted upon the shaft of said checking device, and connected with the lines 3 that are connected with the bridle bit, and a clutch between said winding drum and said shaft consisting of clutch shoes 28 to engage the winding drum and carried by pins 31 that pass through a frame 30 mounted upon a collar 21 that is loosely mounted upon the shaft, springs 33 acting upon said pins 31 to move the clutch shoes 28 away from the winding drum, friction shoes 35 carried by a stationary part of the checking device and adapted to hold the collar 21 immovable with relation to said shaft, and a cam carried by the shaft and adapted to press said pins 31 outwardly to cause the clutch shoes 28 to engage the winding drum, substantially as described.

In testimony whereof I affix my signature in presence of two witnesses.

JOHN DAVIE.

Witnesses:
WM. H. LOTZ,
HARRY COBB KENNEDY.